United States Patent
Apap et al.

(10) Patent No.: US 12,472,859 B2
(45) Date of Patent: Nov. 18, 2025

(54) CONVEYOR SYSTEM

(71) Applicant: BELTED BODIES AND TRAILERS PTY LTD, Londonderry (AU)

(72) Inventors: Simon Apap, Londonderry (AU); Daniel Grima, Glossodia (AU); Mark Regel, East Kurrajong (AU)

(73) Assignee: APAP AND GRIMA PTY LTD, Londonderry (AU)

( * ) Notice: Subject to any disclaimer, the term of this patent is extended or adjusted under 35 U.S.C. 154(b) by 145 days.

(21) Appl. No.: 18/290,745

(22) PCT Filed: Jul. 15, 2022

(86) PCT No.: PCT/AU2022/050744
§ 371 (c)(1),
(2) Date: Jan. 19, 2024

(87) PCT Pub. No.: WO2023/000018
PCT Pub. Date: Jan. 26, 2023

(65) Prior Publication Data
US 2024/0367571 A1    Nov. 7, 2024

(30) Foreign Application Priority Data

Jul. 20, 2021 (AU) ............................... 2021206819

(51) Int. Cl.
*B60P 1/38* (2006.01)
*B65G 21/02* (2006.01)

(52) U.S. Cl.
CPC ............... *B60P 1/38* (2013.01); *B65G 21/02* (2013.01)

(58) Field of Classification Search
None
See application file for complete search history.

(56) References Cited

U.S. PATENT DOCUMENTS 3,049,251 A * 8/1962 Glew .................. B60P 1/38
                                                    414/528
3,282,456 A * 11/1966 Hawes ................ B61D 47/00
                                                    414/502

(Continued)

FOREIGN PATENT DOCUMENTS

EP          611676 A1 *  8/1994
JP       H07223480 A     8/1995
JP       H07300042 A    11/1995

OTHER PUBLICATIONS

International Search Report and Written Opinion for international application No. PCT/AU2022/050744, mailing date of Aug. 12, 2022.

*Primary Examiner* — Joseph A Dillon, Jr.
(74) *Attorney, Agent, or Firm* — FRESH IP PLC; Clifford D. Hyra; Aubrey Y. Chen

(57) ABSTRACT

Disclosed herein is a conveyor system that includes: a plurality of elongate rib elements coupled in a spaced transverse configuration atop a pair of chassis rails, each of the rib elements defining an elongate through opening; a planar support element coupled atop the rib elements, for supporting a portion of the conveyor belt assembly; a conveyor belt assembly having a conveyor belt, a plurality of transverse belt support elements coupled across a plurality substantively parallel lengths of conveyor chains, and the conveyor belt; whereby the planar support element is sized to enable a path for the conveyor belt system when formed in continuous loop configuration being returned through the apertures defined in each rib element; and a pair of transverse axles operating about each end of the conveyor assembly, each axle having a gear for engaging a respective chain, wherein one axle is driven to move the conveyor belt assembly.

20 Claims, 14 Drawing Sheets

(56) References Cited

U.S. PATENT DOCUMENTS

| | | | |
|---|---|---|---|
| 3,593,864 A | 7/1971 | Moser | |
| 3,819,072 A * | 6/1974 | Reed | B60P 1/38 |
| | | | 414/528 |
| 3,913,760 A * | 10/1975 | Koral | B60P 1/38 |
| | | | 414/528 |
| 4,068,769 A * | 1/1978 | Sweet | B65F 3/24 |
| | | | 116/28 R |
| 4,253,791 A * | 3/1981 | Van Drie | B65F 3/24 |
| | | | 414/528 |
| 4,461,378 A * | 7/1984 | Roth | B65G 47/945 |
| | | | 198/822 |
| 4,505,634 A * | 3/1985 | Rezac | B60P 1/36 |
| | | | 414/528 |
| 4,553,663 A * | 11/1985 | Johnson | A01D 61/02 |
| | | | 198/848 |
| 5,102,285 A * | 4/1992 | Gust | B60P 1/38 |
| | | | 198/849 |
| 5,413,451 A * | 5/1995 | Pellegrino | B65G 67/20 |
| | | | 414/528 |
| 6,039,171 A * | 3/2000 | Trieb | B65G 17/02 |
| | | | 198/821 |
| 6,116,842 A * | 9/2000 | Harris | B65G 1/0485 |
| | | | 414/529 |
| 6,364,763 B1 * | 4/2002 | Schoenherr | A01K 5/0107 |
| | | | 56/473.5 |
| 7,128,201 B2 * | 10/2006 | Jones | B65G 15/62 |
| | | | 198/615 |
| 8,312,989 B2 * | 11/2012 | McCormick | B65G 17/063 |
| | | | 198/849 |
| 10,052,993 B2 * | 8/2018 | Wikel | B60P 1/38 |
| 10,155,624 B1 * | 12/2018 | Nix | B65G 15/08 |
| 10,358,297 B2 * | 7/2019 | Fehr | B65G 39/16 |
| 10,899,546 B2 * | 1/2021 | Munday | B65G 41/005 |
| 11,208,023 B2 * | 12/2021 | Marble | B60P 1/16 |
| 11,332,314 B2 * | 5/2022 | Hornick | B23K 26/0838 |
| 11,400,849 B2 * | 8/2022 | Key | B60P 1/36 |
| 2007/0029171 A1 * | 2/2007 | Nemedi | B65G 15/42 |
| | | | 198/841 |
| 2011/0308914 A1 * | 12/2011 | Gausman | B65G 67/24 |
| | | | 198/311 |
| 2017/0144579 A1 | 5/2017 | Wikel et al. | |

\* cited by examiner

CONVEYOR SYSTEM

This application is a National Phase entry of International Application No. PCT/AU2022/050744 under § 371 and claims the benefit of Australian Patent Application No. 2021206819, filed Jul. 20, 2021, which is hereby incorporated by reference in its entirety.

FIELD OF THE DISCLOSURE

The present disclosure relates to conveyor systems, and in particular to conveyor systems used with haulage systems.

Embodiments of the invention have been developed primarily for use as a conveyor system for a vehicle tray or trailer, and will be described hereinafter with reference to this application. However, it will be appreciated that embodiments of the invention are not limited to this particular field of use.

BACKGROUND

Any discussion of the prior art throughout the specification should in no way be considered as an admission that such prior art is widely known or forms part of the common general knowledge in the field.

Known vehicle conveyor systems used for haulage are installed to operate between chassis rails of the tray or trailer. This limits the width of the conveyor system.

Known vehicle conveyor systems used for haulage utilise chain linkages coupled to a conveyor belt, whereby the chain typically operates within a channel and receives the vertical load imposed by the supported cargo. This places significant wear on the chain.

There is need in the art for improved conveyor systems that can be used in a haulage environment on vehicles or trailers.

It is an object of embodiments of the present invention to overcome or ameliorate at least one of the disadvantages of the prior art, or to provide a useful alternative.

It is an object of the invention in a preferred embodiment to provide a conveyor system for vehicle tray or trailer.

SUMMARY

According to an aspect of a preferred embodiment of the invention, there is provided a conveyor system, the system having a tray assembly including:
a plurality of elongate rib elements coupled in a transverse configuration across atop a pair of chassis rails (or sub frame) provided by a vehicle or trailer; and
wherein each of the rib elements define an elongate through opening for providing a return path of a conveyor belt assembly.

Preferably the through opening of the rib elements is wider than the chassis rail separation. More preferably, the rib elements are adapted to strengthen the through opening. Most preferably, the rib elements are spaced along the chassis rails and underpin a planar support element for supporting a portion of a conveyor belt assembly.

Preferably, the rib element is configured from a 'C' channel. More preferably, the rib element includes cut-outs along a lower edge for receiving the chassis rails.

According to an aspect of a preferred embodiment of the invention, there is provided a conveyor system, the system having a belt assembly including:
a plurality of transverse belt support elements coupled in a transverse configuration across a plurality of substantially parallel lengths of conveyor chains; and
wherein the belt support element supports the conveyor belt under load.

Preferably, the belt assembly includes a belt. More preferably, the belt assembly can be split into a linear configuration for installing, whereby the ends are couplable to define a conveyor loop. Most preferably, the conveyor loop is drawn atop the planar support surface and returns via through openings in rib elements of the tray assembly.

Preferably, each belt support element is coupled to the conveyor chains, such that vertical forces applied by the cargo are not directly applied between the chain and planar support element.

Preferably, each belt support element is operatively associated with the conveyor belt, and transfers load applied by cargo to a planar support element. More preferably, the belt support element includes a support channel having glide elements that provide reduced friction between the belt support element and planar support element. Most preferably, the belt support element further incorporates thermal insulation between the conveyor belt and glide elements.

Preferably, each belt support element is adapted to be coupled to a pair of substantially parallel lengths of conveyor chains. Alternatively, each belt support element is adapted to be coupled to three substantially parallel lengths of conveyor chains. Alternatively, each belt support element is adapted to be coupled to more than three substantially parallel lengths of conveyor chains.

Preferably the belt support element includes a buffer element at each end, for limiting transverse movement of the support element when abutting edge guides. More preferably the conveyor belt is wider than the belt support element, whereby opposing longitudinal sidewalls define a substantively vertical edge guide and substantially horizontal outwardly directed edge support. Most preferably, the belt extending beyond the belt support element onto the horizontal edge support restricts movement of hauled items travelling below the belt.

Preferably, when used on a tray or trailer, longitudinal sidewalls are affixed to the planar support element, such that the tray or trailer can be substantively used with the conveyor belt removed.

Preferably the conveyor system is used on a vehicle (vehicle tray) or trailer. More preferably, the conveyor system is supported by chassis rails of the vehicle or trailer. Most preferably, the conveyor system provides a conveyor belt that is wider than the separation of the chassis rails.

According to an aspect of a preferred embodiment of the invention, there is provided a conveyor system for use on a pair of chassis rails provided by a vehicle or trailer, the system including:
a plurality of elongate rib elements coupled in a spaced transverse configuration atop the pair of chassis rails, each of the rib elements defining an elongate through opening (or aperture);
a planar support element coupled atop the rib elements, for providing a surface that supports a portion of the conveyor belt assembly under load applied by the cargo;
a pair of opposed longitudinal sidewalls (or side sheets) coupled atop the planar support element;
a conveyor belt assembly including a conveyor belt, a plurality of transverse belt support elements coupled across a plurality substantively parallel lengths of conveyor chains, and operatively associated with the conveyor belt;

whereby the planar support element is sized to enable a path for the conveyor belt assembly being drawn along the planar support element and returned through the apertures defined in each rib element, thereby providing a return path of a conveyor belt assembly when formed in continuous loop configuration; and a pair of transverse axles operating about each end of the conveyor assembly (when in the continuous loop configuration), each axle having a gear for engaging a respective chain, wherein one axle is driven by (or coupled to) a motor for moving (or cycling) the conveyor belt assembly.

Preferably, a second axel is driven by (or coupled to) a second motor for moving (or cycling) the conveyor belt assembly. More preferably, a plurality of motors (and respective gearboxes) are coupled to one or both axles.

According to an aspect of a preferred embodiment of the invention, there is provided a conveyor system when use on a pair of chassis rails provided by a vehicle or trailer, the system being described herein.

BRIEF DESCRIPTION OF THE DRAWINGS

The invention will now be described, by way of example only, with reference to the accompanying drawings in which:

FIG. 5 is a perspective view of a part embodiment belt assembly (shown without the conveyor belt), when installed on a tray assembly;

DETAILED DESCRIPTION

Figure 1:
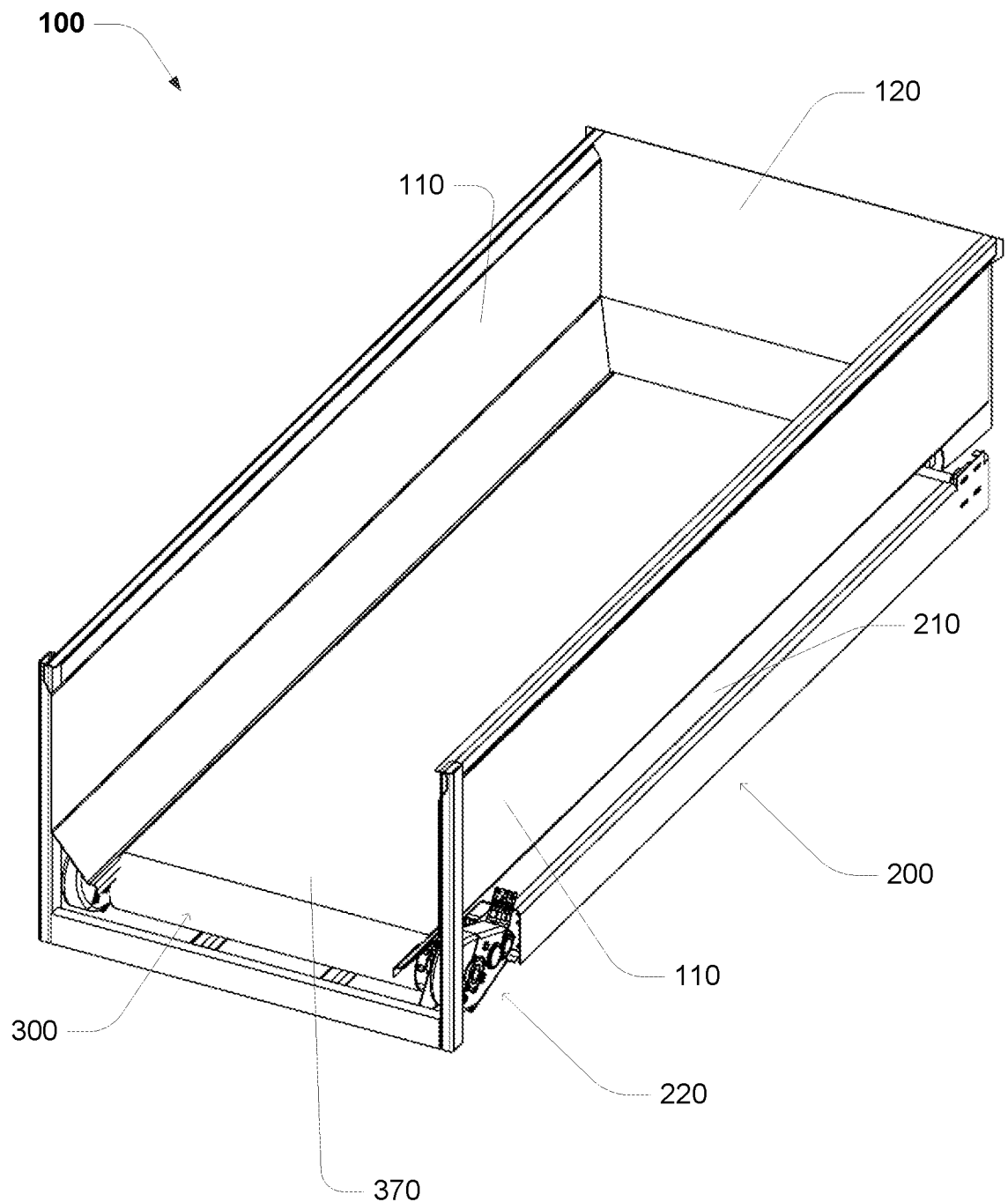
FIG. 1 is a perspective view of an embodiment conveyor system.
Figure 2:
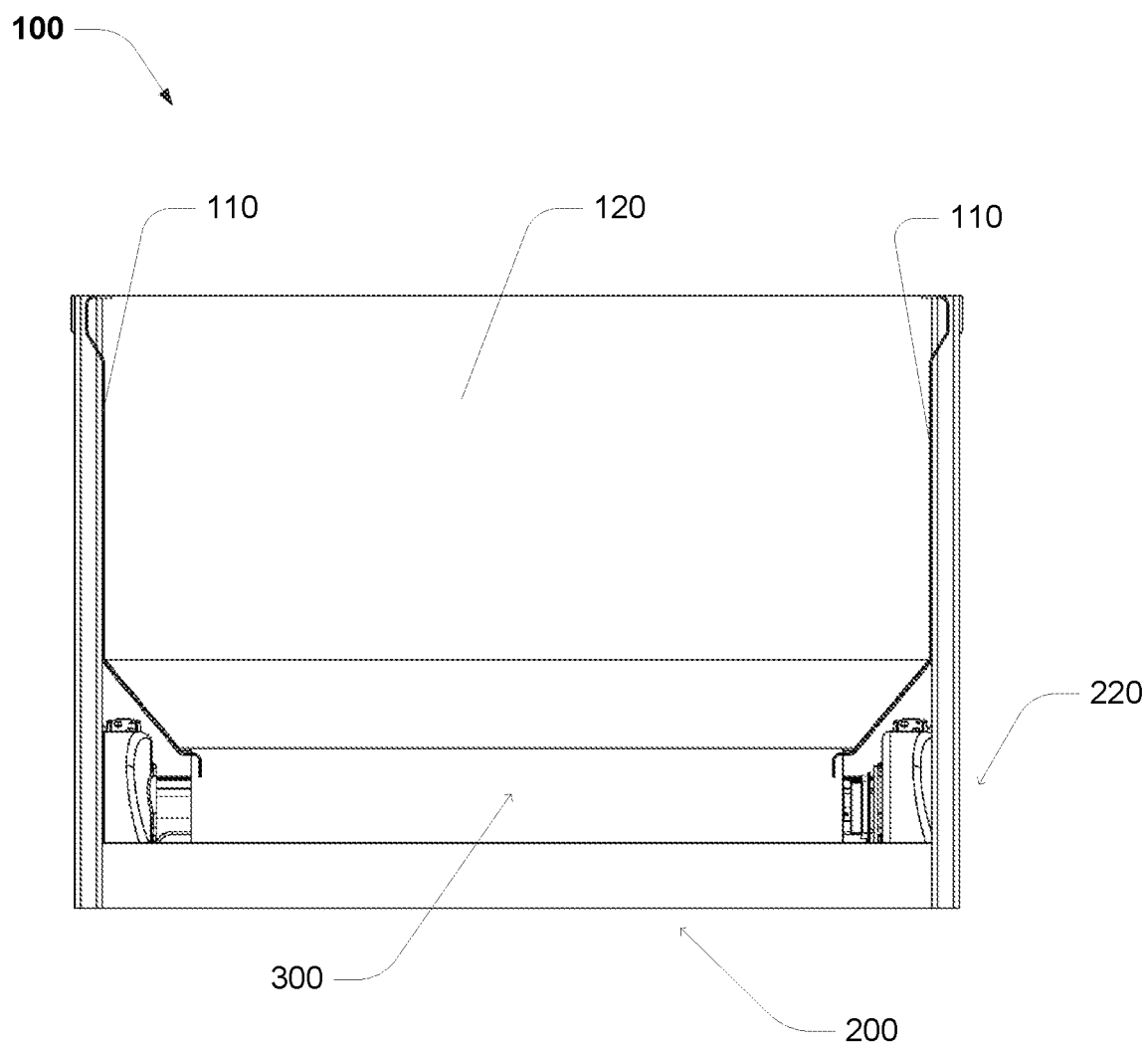
FIG. 2 is an end view of the embodiment conveyor system of FIG. 1.

Referring to FIG. 1 and FIG. 2, an embodiment conveyor system 100 for vehicle tray or trailer includes a tray assembly 200 and a belt assembly 300.

The vehicle tray or trailer typically includes a pair of opposed side sheets 110 and an end sheet 120. A movable or removable rear door (not shown) may also be included. It will be appreciated that the side sheets and end sheet define a region (or space) for receiving cargo (not shown).

In this embodiment, the tray assembly defines a planar support element (or floor plate/sheet) 210 that defines a surface for supporting a portion of the belt assembly under load from the cargo, and enables the belt assembly to be drawn across the surface. The side sheets are coupled (typically welded) to the support element, and can both assist with guiding the belt assembly, and supporting/sealing the edge of the belt.

In this embodiment, a drive axle and motor (at 220), through driven rotation of the drive axle and indexed engagement with the belt assembly, are adapted to draw the belt assembly across the planar support element 210.

Figure 3:
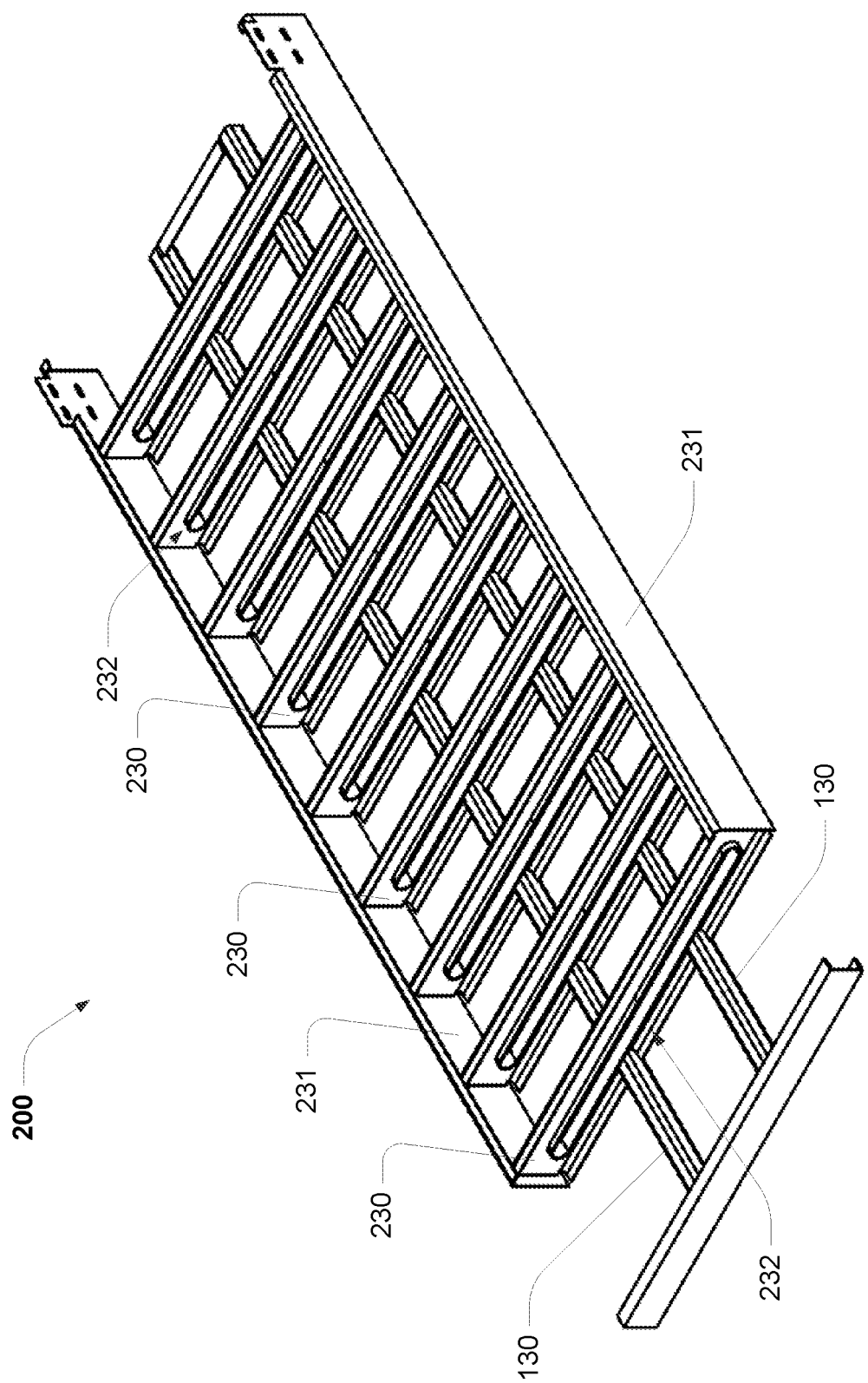
FIG. 3 is a perspective view of a part embodiment tray assembly.

Referring to FIG. 3, it will be appreciated that a conventional vehicle tray or trailer typically provides a pair of parallel chassis rails 130. In this embodiment, the tray assembly 200 includes:

a plurality of elongate rib elements (or cross member elements) 230 coupled (typically welded) in a transverse configuration across atop a pair of chassis rails 130 provided by a vehicle or trailer; and wherein each of the rib elements define an elongate through opening 232 for providing a return path of a conveyor belt assembly.

It would be appreciated by those skilled in the art that, for a vehicle installation, the chassis rails 130 are typically a sub-frame that sits atop chassis of a vehicle. This sub-frame is typically dimensioned according to the respective vehicle chassis, and therefore varies in width. It would be further appreciated that, for a trailer installation, the chassis rails 130 are typically an integral portion of the trailer structure. Accordingly, the chassis rails 130 can be provided as a sub-frame on, or integrally formed with, the vehicle or trailer.

In this embodiment, the rib elements 230 are spaced along the chassis rails 130 and underpin a planar support element (or floor sheet/plate) 210 for supporting a portion of a conveyor belt assembly 300.

In this embodiment, by way of example only, the rib elements 230 are interlinked or coupled at their ends by side rails 231.

Figure 4:
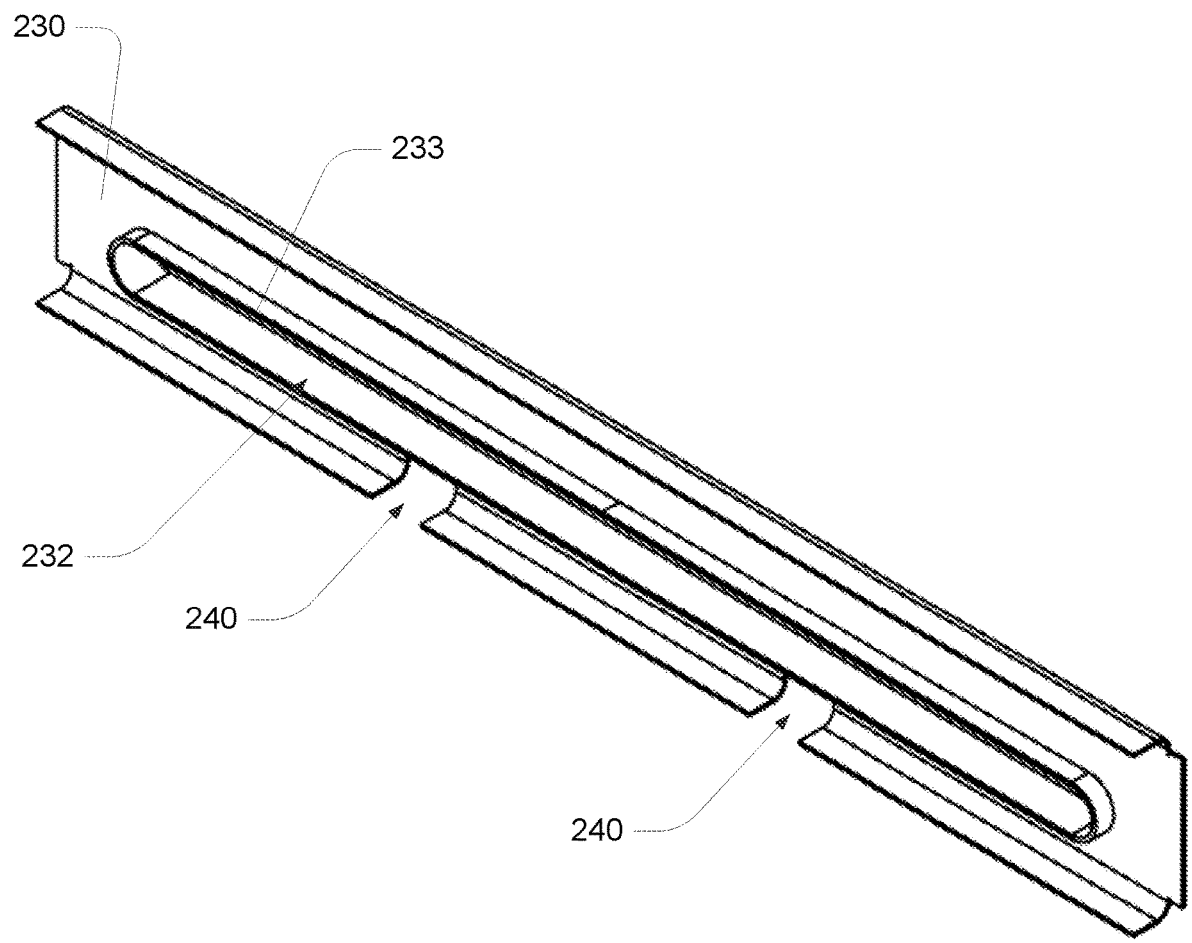
FIG. 4 is a perspective view of an embodiment rib element (or crossmember element)

FIG. 4 shows a perspective view of an embodiment rib element (or crossmember element) 230.

In this embodiment, the rib element 230 is elongate, with an elongate through opening 232. The through openings are typically reinforced 233. A notable advantage of this assembly is that the through opening can be wider than the chassis rail separation, for accommodating a wider belt assembly.

In this embodiment, the rib element 230 is configured from a 'C' channel (in cross section). The rib element includes cut-outs 240 along a lower edge for receiving a respective top portion of a chassis rail. It will be appreciated that this enables the rib element to be welded about each chassis rail, and enables a lower centre of gravity for the conveyor belt assembly (or conveyor belt surface).

Figure 5:
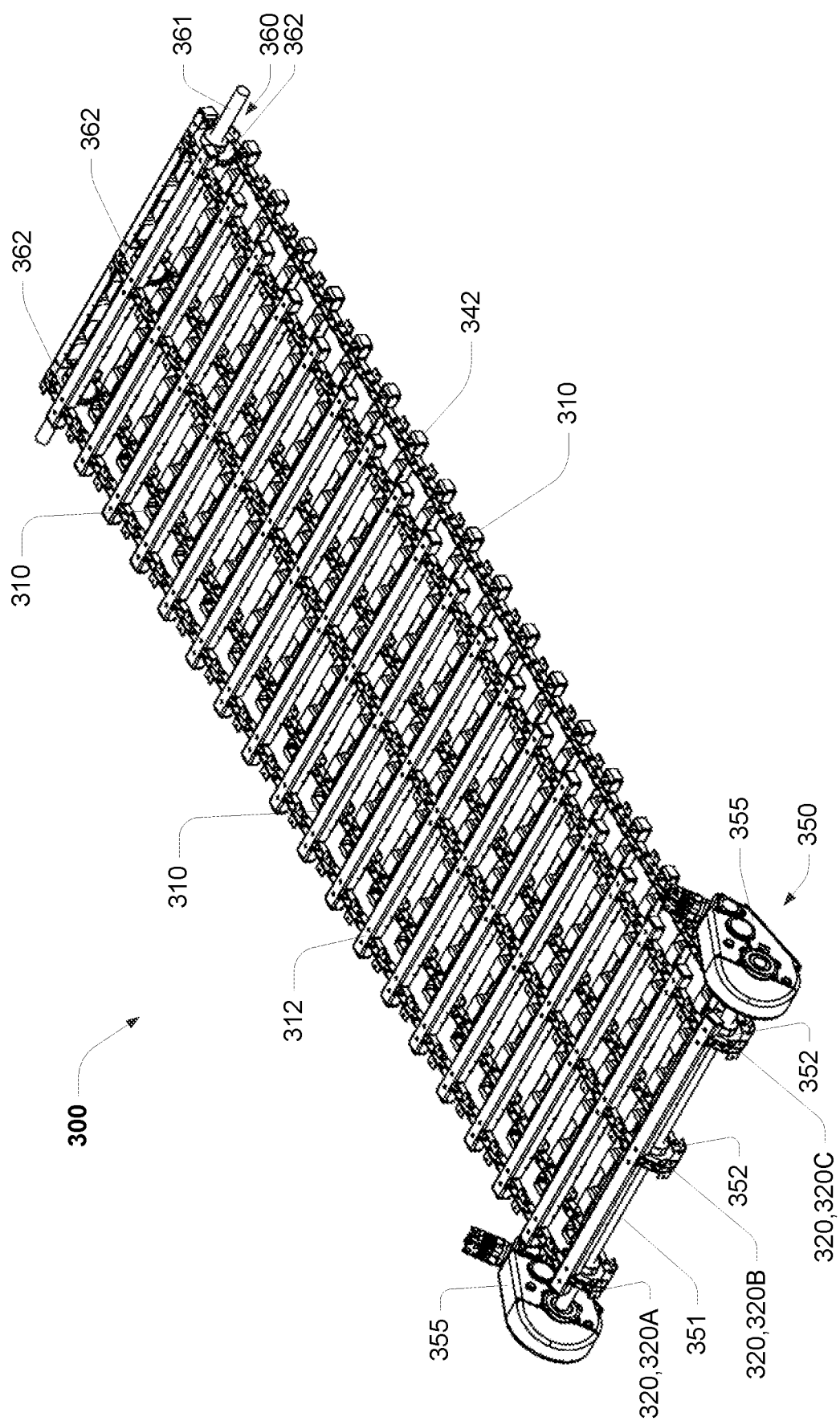
FIG. 5 is a perspective view of a part embodiment belt assembly (shown without the conveyor belt)

FIG. 5 shows a perspective view of a part embodiment belt assembly 300, shown without the conveyor belt.

In this embodiment, by way of example only, a conveyor system has a belt assembly 300 that includes:

a plurality of transverse belt support elements (or slat elements) 310 coupled in a transverse configuration across a plurality substantively parallel lengths of conveyor chains 320 (320A, 320B, 320C); and wherein the belt support element supports a conveyor belt under load from cargo.

The belt assembly includes a conveyor belt that is coupled to a top of the support elements.

In an embodiment, the belt assembly can be split into a linear configuration for installing, whereby the ends are couplable to define a conveyor loop. The conveyor loop is drawn atop the planar support surface and returns via through openings in rib elements of the tray assembly.

In an embodiment, each belt support element is coupled to the conveyor chains, such that vertical forces applied by the cargo are not directly applied between the chain and planar support element. It will be appreciated that the belt support element can be coupled (e.g. at 312) to the conveyor chain by ears (e.g. 322) associated with preselected chain links. It will be further appreciated that, particularly for systems not requiring to handle substantial load, belt support elements need not be connected to each ear provided by the chain (e.g. as shown in FIG. 6B).

In an embodiment, each belt support element is operatively associated with or coupled to the conveyor belt, and transfers load applied by cargo to a planar support element. The belt support element includes a support channel 330 having one or more glide elements 340 that provide reduced friction between the belt support element and planar support element (as best shown on FIG. 9A through FIG. 10D). The belt support element can further incorporate thermal insulation between the conveyor belt and glide elements.

In an embodiment, by way of example, it will be appreciated that the conveyor belt can be substantively free moving, relying on the load force to enable the conveyor belt to move with the driven belt support element and chain(s). In this embodiment, the belt is operatively associated with, or 'coupled' to the support elements through location and application of frication.

In an embodiment, each belt support element is adapted to be coupled to a pair of substantially parallel lengths of conveyor chains 320 (as best shown on FIG. 5). Alternatively, each belt support element can be adapted to be coupled to three substantially parallel lengths of conveyor chains. Alternatively, each belt support element can be adapted to be coupled to more than three substantially parallel lengths of conveyor chains.

Figure 8A:
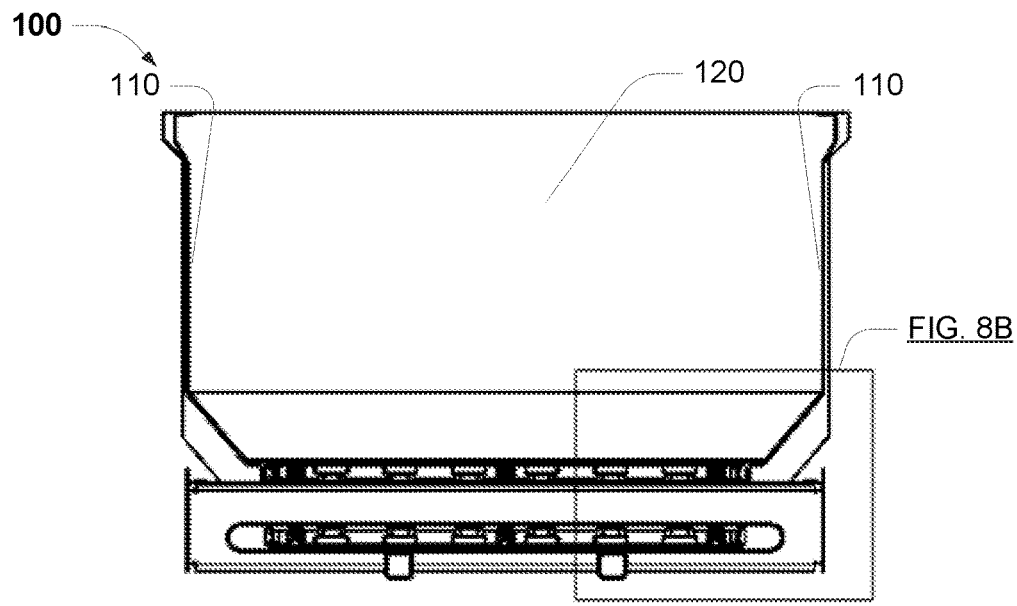
FIG. 8A is a cross sectional view of an embodiment conveyor system.
Figure 8B:
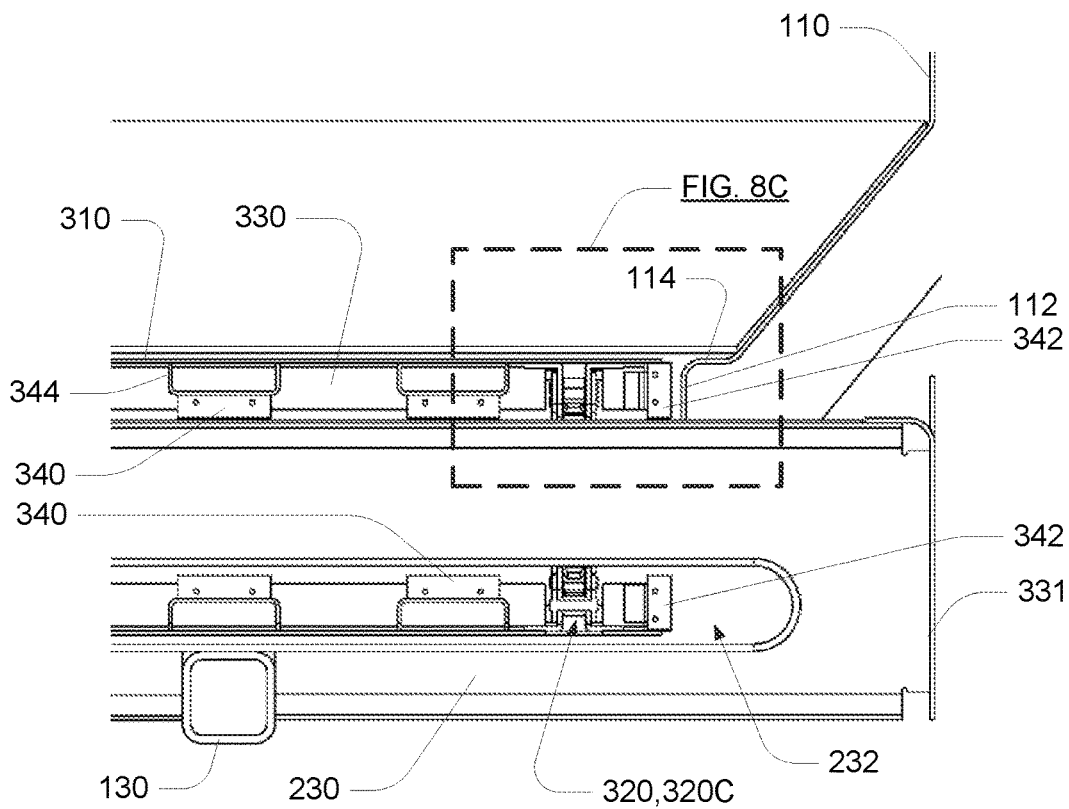
FIG. 8B is an enlarged partial cross-sectional view of the embodiment conveyor system of FIG. 8A.

In an embodiment, each belt support element includes a buffer element 342 at each end, for limiting transverse movement of the support element when abutting edge guides (at 112 shown in FIG. 8B). The conveyor belt can be wider than the belt support element, whereby opposing longitudinal side sheets define a substantively vertical edge guide 112 and substantially horizontal outwardly directed edge support 114. The edge support can both support the conveyor belt and provide additional sealing for loose cargo material.

It will be appreciated that this configuration provides an advantage of not needing dedicated chain guides, thereby reduced maintenance requirements and facilitating reconfigurability (for example, quick change to different conveyor configurations that offer changed bearing type, spacing, slat density for differing loads).

In an embodiment, the conveyor system further includes an axle assembly (350,360) located at each end of the belt assembly (when in the loop configuration) for both driving and guiding movement of the chain elements. Each axle (351,361) includes a plurality of gears or cogs (352,362), such that each engages a respective one of the chains. It will be appreciated that by the gears being attached to a single shaft, movement of the chain is indexed. For the driven axle assembly, a motorised drive element 355 is used to drive rotation of the axle and associated gears for drawing the belt assembly when unloading (or loading) the cargo.

Figure 6A:
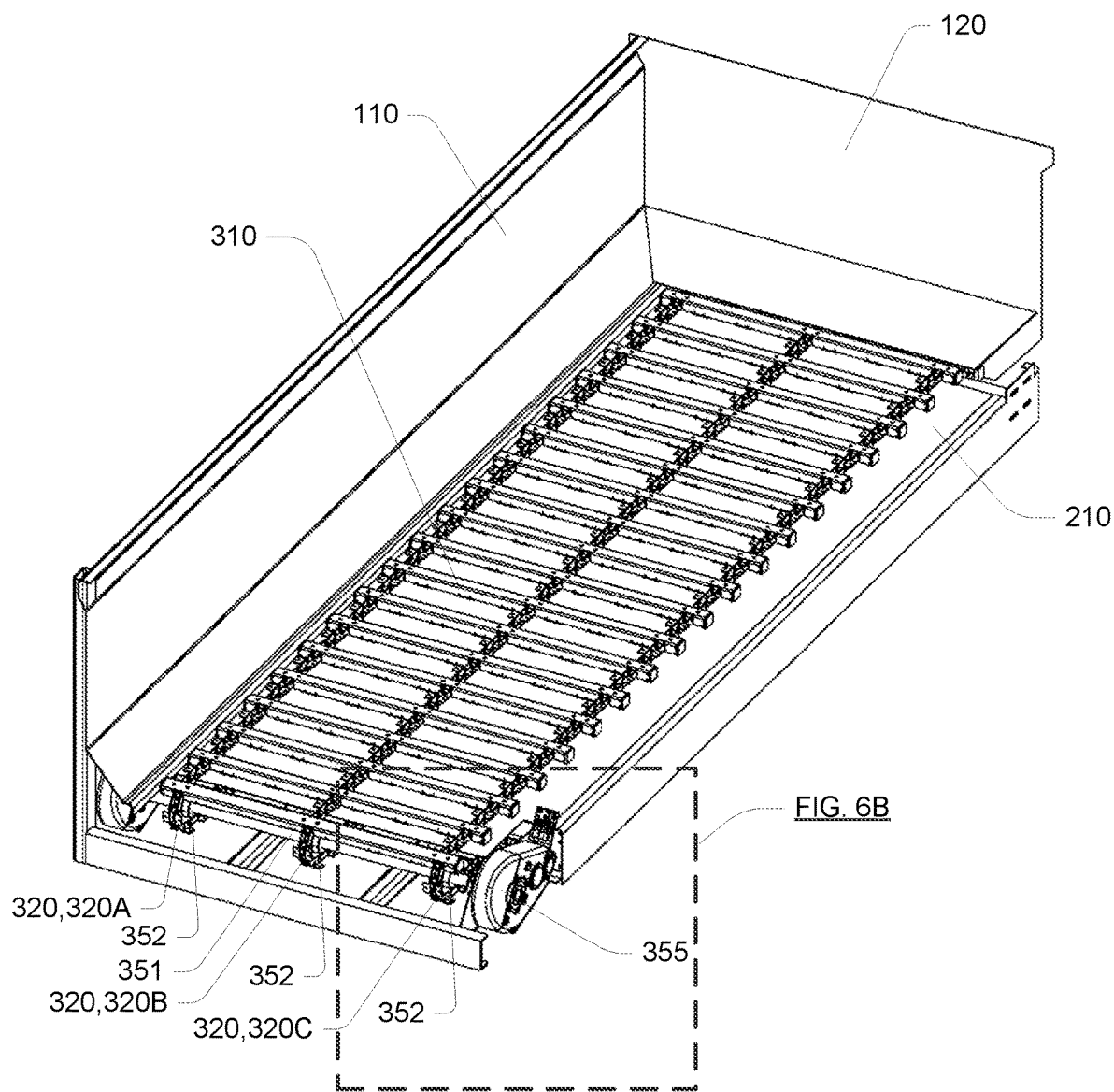
FIG. 6A is a part perspective view of an embodiment belt assembly of FIG. 5.
Figure 6B:
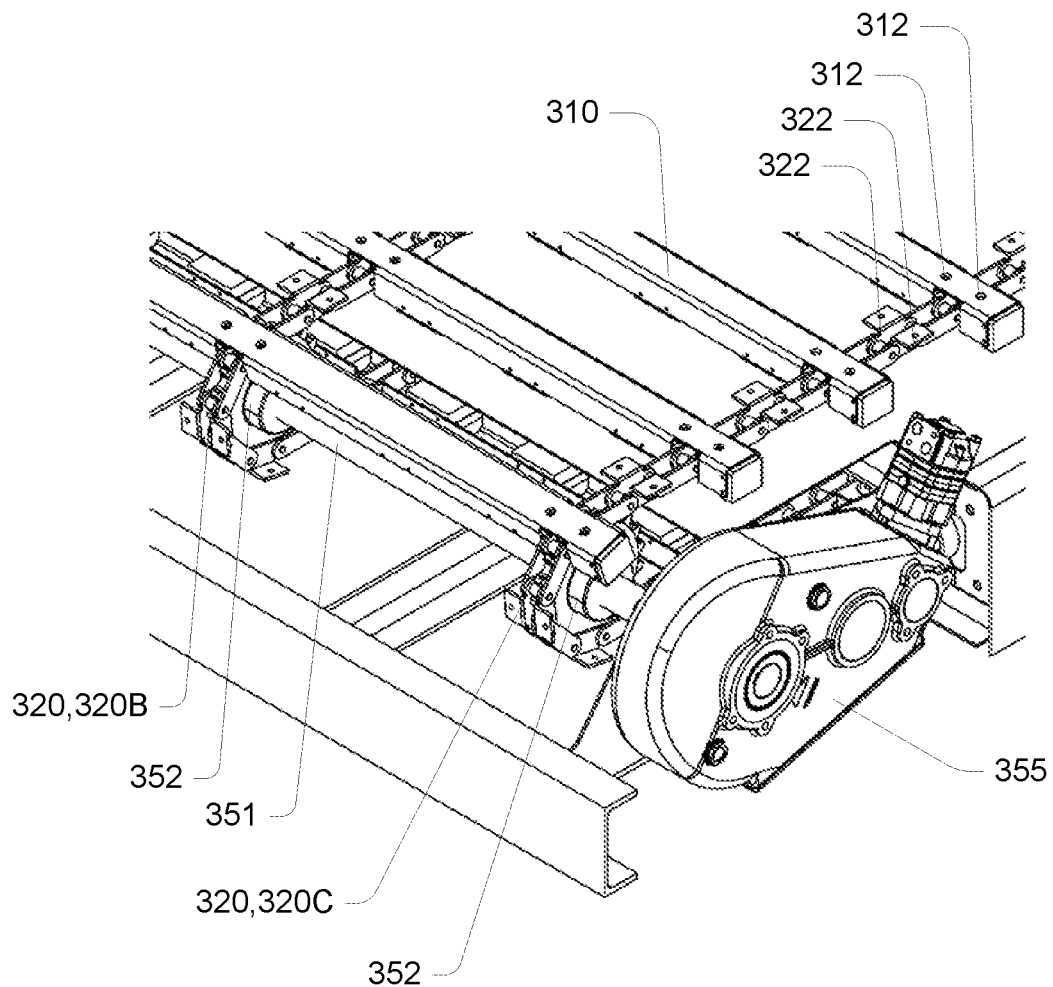
FIG. 6B is an enlarged part perspective view of the belt assembly of FIG. 6A.

FIG. 6A is a part perspective view of an embodiment belt assembly. This figure shows the belt assembly 300 (excluding the conveyor belt) in situ. It will be appreciated that the upper portion of the belt assembly is drawn across the atop the planar support element (of floor sheet) 210.

FIG. 6B shows an enlarged part perspective view of the belt assembly of FIG. 6A. A person skilled in the art would understand the operation of the motor, axles, and geared engagement with the chain.

Figure 7A:
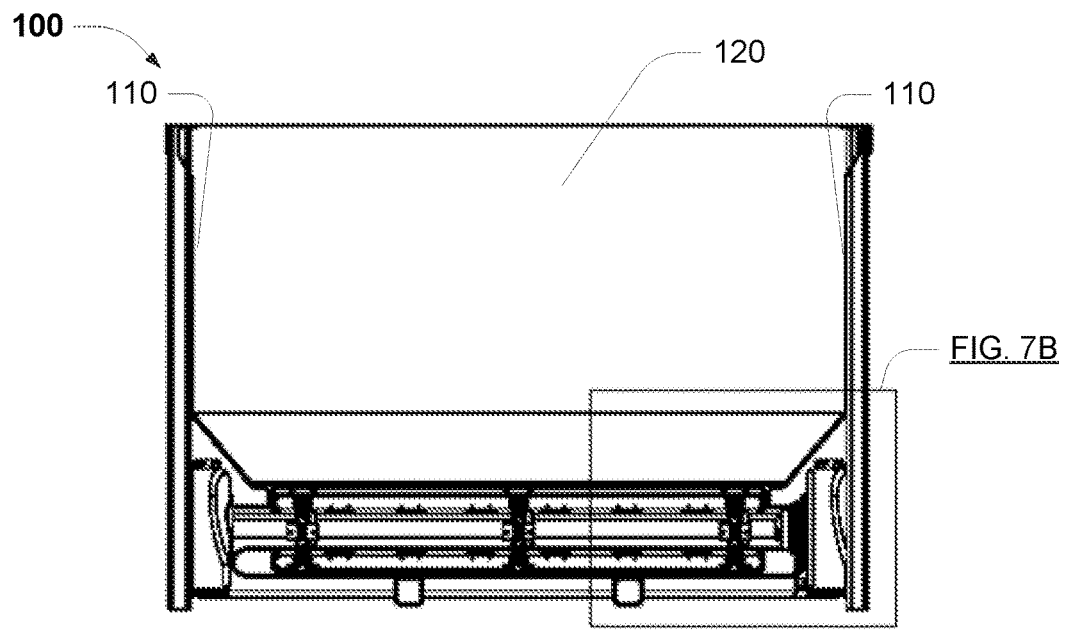
FIG. 7A is an end view of an embodiment conveyor system.
Figure 7B:
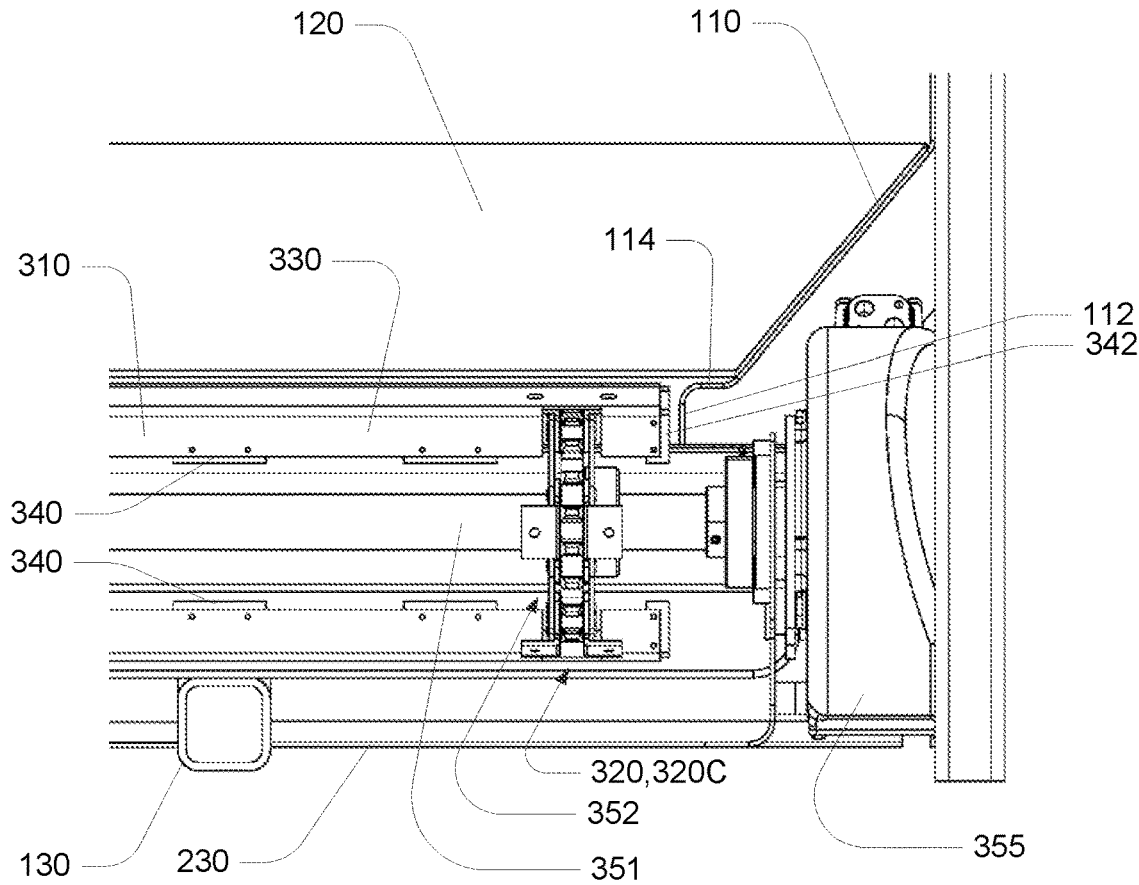
FIG. 7B is an enlarged partial view of an embodiment conveyor system of FIG. 7A.

FIG. 7A shows end view of an embodiment conveyor system, with FIG. 7B providing an enlarged partial view. FIG. 8A shows a cross sectional view of the conveyor system, with FIG. 8B providing an enlarged partial cross-sectional view.

Referring to FIG. 7A through FIG. 8B, it will be appreciated that movement of the conveyor belt 370 is controlled by the motor 355 rotating axle 351 to turn the cogs 352, which index to the chain 320 to move the support elements (or slat elements) 310 operatively associated with (or coupled to) the conveyor belt.

Figure 8C:
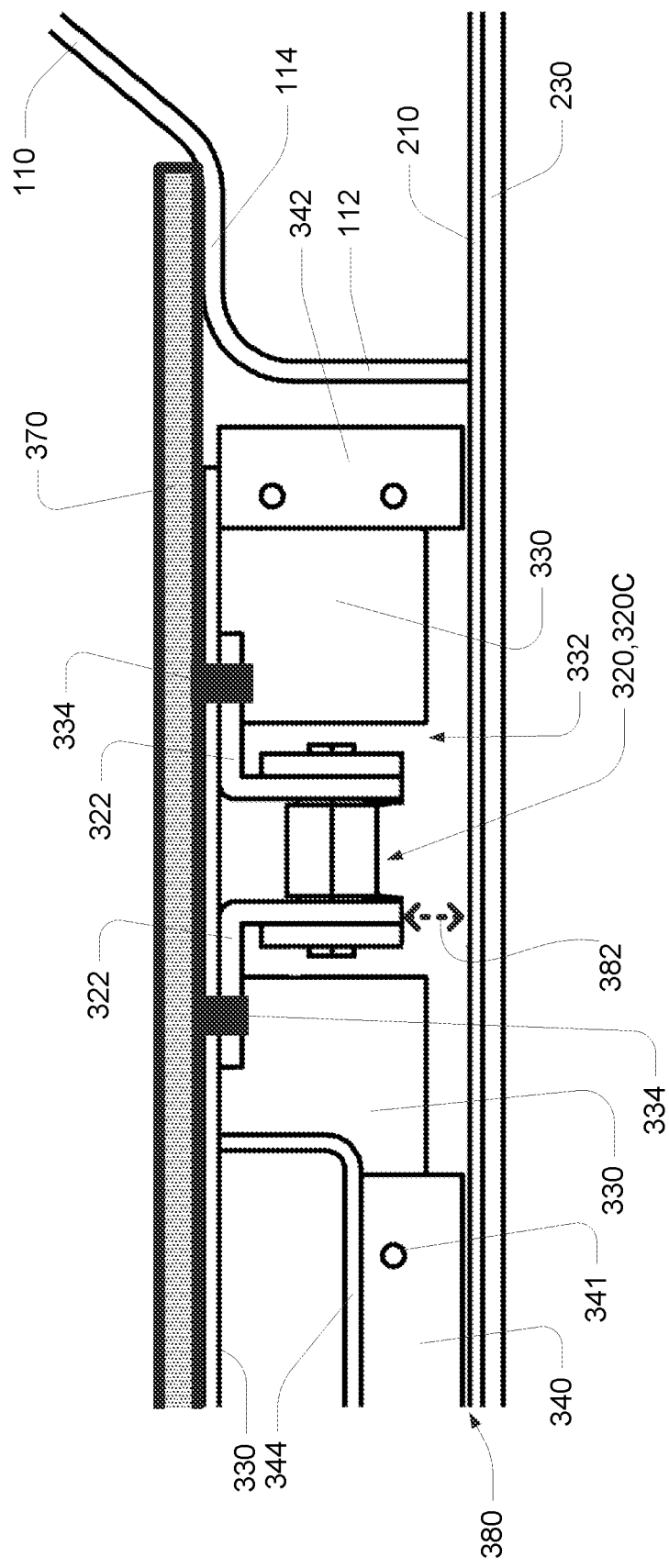
FIG. 8C shows a further enlarged partial sectional view the embodiment conveyor system of FIG. 8A, including the conveyor belt.

FIG. 8C is a further enlarged partial sectional view the embodiment conveyor system of FIG. 8A, but including the conveyor belt, showing the engagement of the belt assembly 300 on the upper surface of the planar support element (or floor plate/sheet) 210. In this view, the section is taken through a channel element.

It will be appreciated that the channel element 330 defines a notch 332 that receives a link of the chain 320, enabling the ears 322 for that link to be affixed (e.g. by bolts, screws or the like) 334 about the upper portion of the channel element. The chain passing longitudinally through the channel element. It will be appreciated that, due to the compressibility of the belt material and its thermal conductivity, the 'fastener' connects the chain to the slat. It will also be appreciated that, if the belt needs to be fastened to the slat directly, this can occur elsewhere along the length of the slat (not shown).

A glide element 340 is fixed to the channel element 341 (e.g. by bolts, screws or the like). A buffer element 342 is also fixed to the end of the channel element 341. In this embodiment, by way of example only, a spacer element 344 is located between glide element and top of the channel element for reducing the volume of glide element required and/or providing thermal insulation to the glide element.

It will be appreciated that the glide element 340 abuts the planar support element (or floor plate/sheet) 210 (at 380), wherein the chain is spaced above (at 382) for eliminating compression load against the support element.

It will be appreciated that structures can be provided to improve thermal transmission from the cargo load though the belt to the slats and glide element. A thermal resistant element (or a void), for example the spacer element 344, can be interleaved between the slat element and a top and/or sides of the guide element.

The glide elements can be configured to reduce materials required and incorporate a thermal break between the top of the slat and the plastics by providing a metal insert (for example, such as the spacer element 344). In an embodiment, the metal insert has a reduced cross-section area in contact with the plastics to reduce thermal conductivity. The guide element is positioned such that it maintains the slat element above the floor plate.

It will be appreciated that the conveyor belt 370 is operatively associated with, or coupled to, a top (outer face in a circular configuration) of the support elements.

The conveyor belt 370 is substantially formed of a conventional conveyor belt material.

In this embodiment, the longitudinal side sheet 110 defines a substantively vertical edge guide 112 and substantially horizontal outwardly directed edge support 114. The buffer element 342 limits transverse movement of the support channel 330 and conveyor belt 370 when abutting the edge guide 112. Suitable tolerances are provided between the buffer element and edge guide to reduce the prospect of belt assembly becoming jammed. The conveyor belt 370 is wider than the support channel 330, with the conveyor belt edges supported by the edge support 114. This also provides further sealing for limiting loose carried items from passing through to below the belt.

Figure 9A:
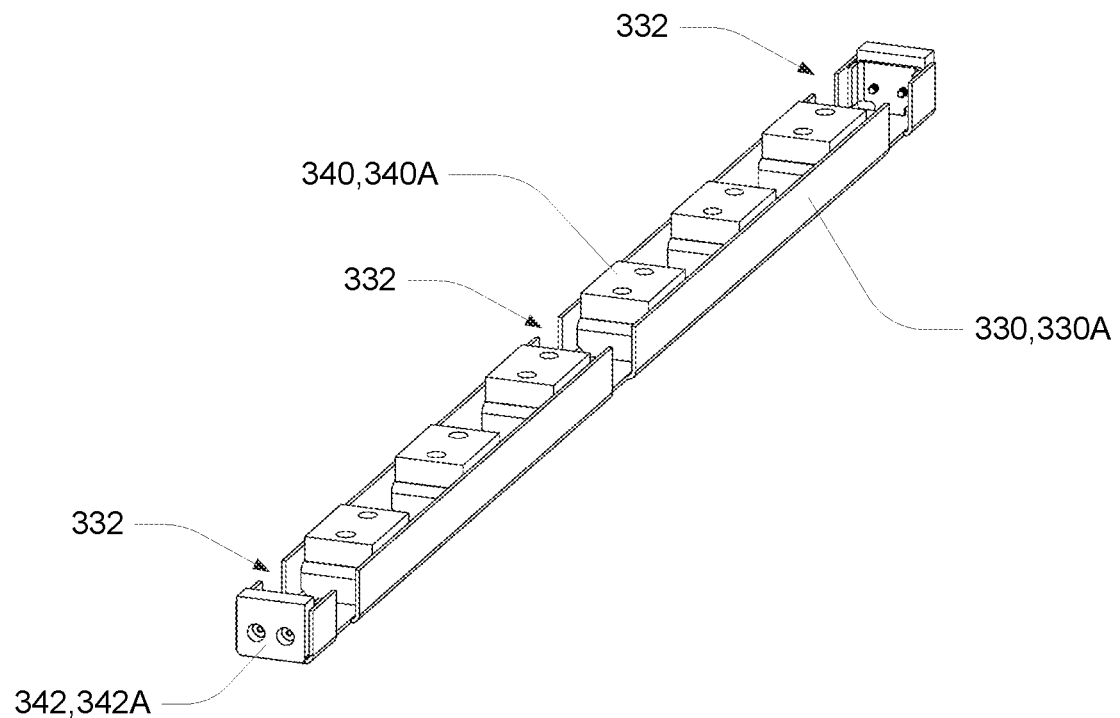
FIG. 9A through FIG. 9D are perspective views of embodiment belt support elements (or slat elements), adapted for a three-chain conveyor system.
Figure 9B:
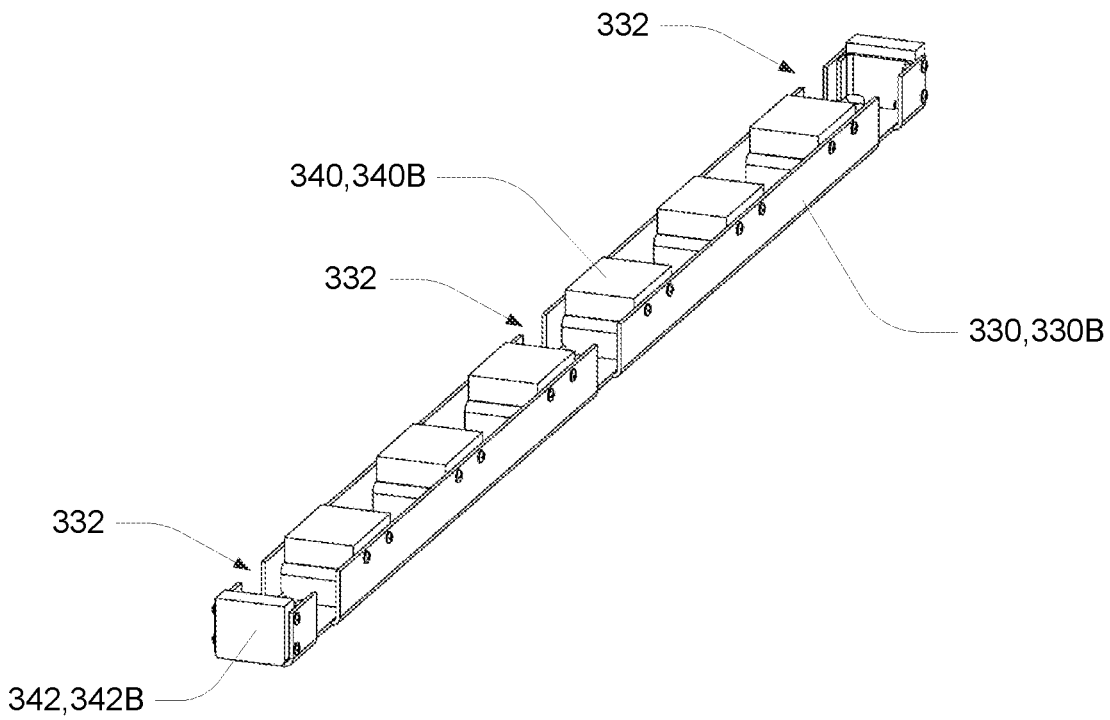
Figure 9C:
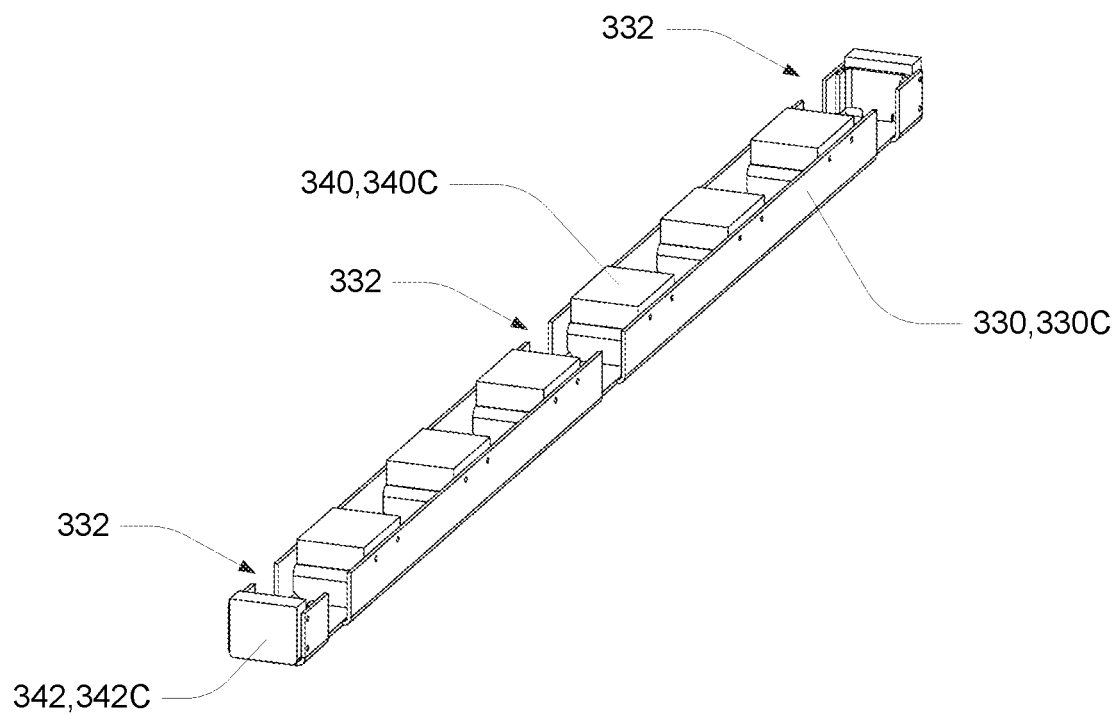
Figure 9D:
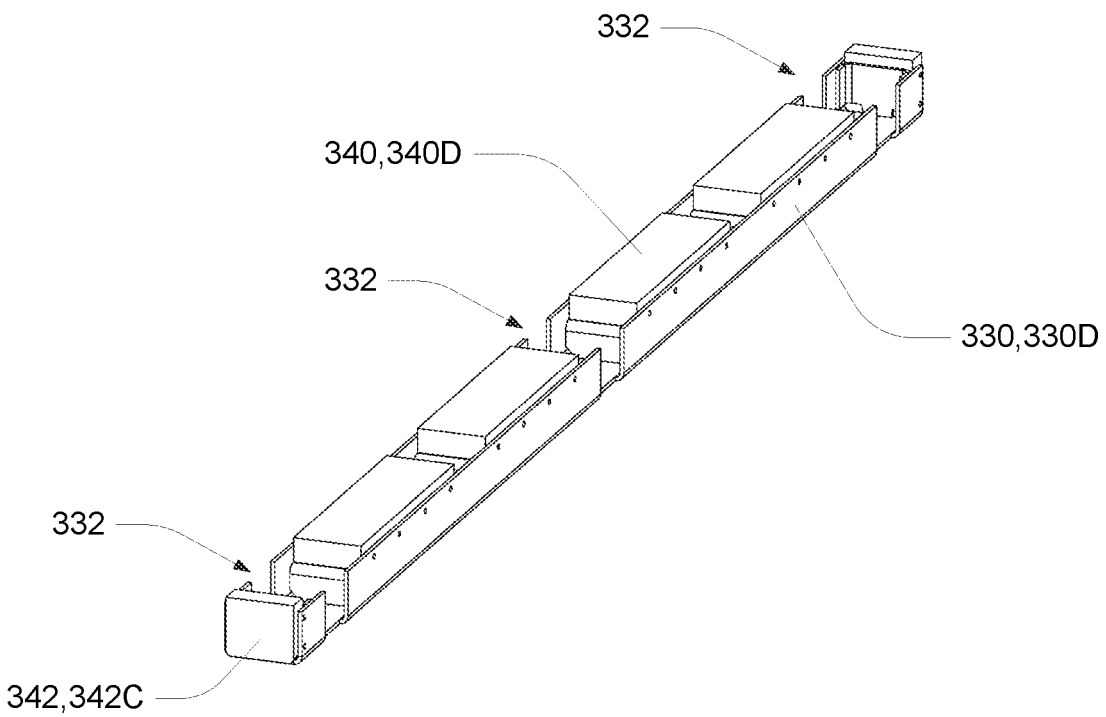

FIG. 9A through FIG. 9D show example embodiments of belt support elements configured for receiving three-chains. In these examples, the support channels 330 (330A, 330B 330C 330D) are substantively a 'C' channel in cross-section. FIG. 9A shows the glide elements fixed to a spacer element coupled to the support channel. FIG. 9B shows the glide elements fixed through the side walls of the support channel. FIG. 9C shows the glide elements fixed through the side walls of the support channel. FIG. 9D shows glide elements being wider for providing a greater glide surface. It will be appreciated that these example embodiments can also be used in a two-chain conveyor system.

Figure 10A:
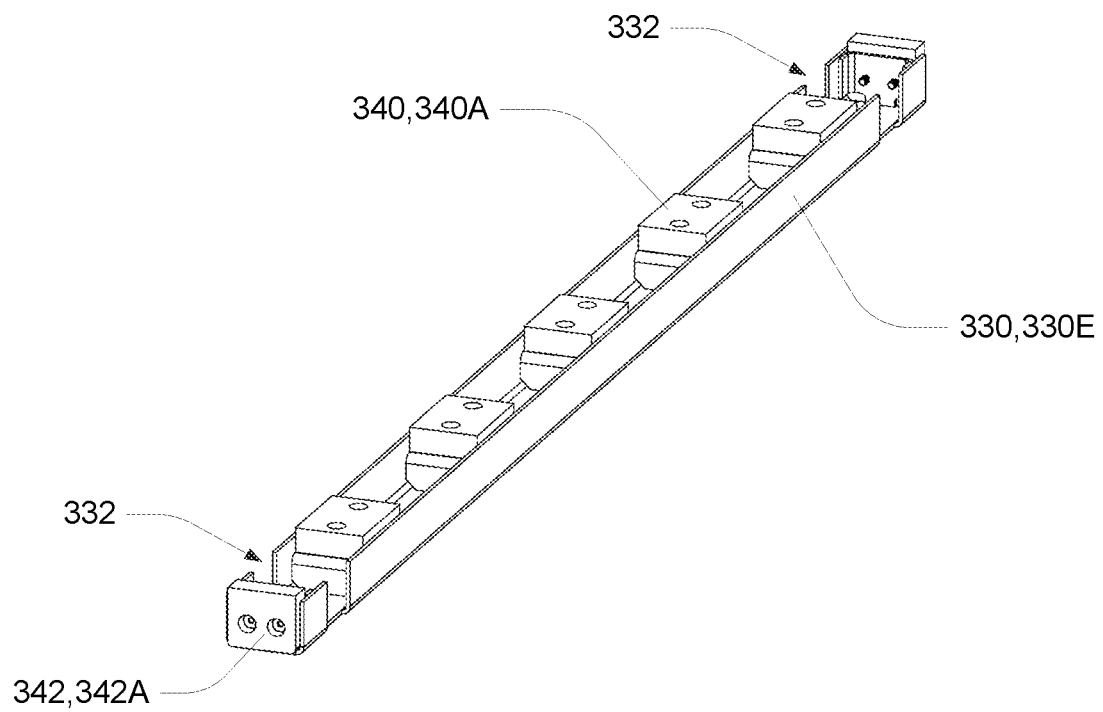
FIG. 10A through FIG. 10D are perspective views of embodiment belt support elements (or slat elements), adapted for a two-chain conveyor system.
Figure 10B:
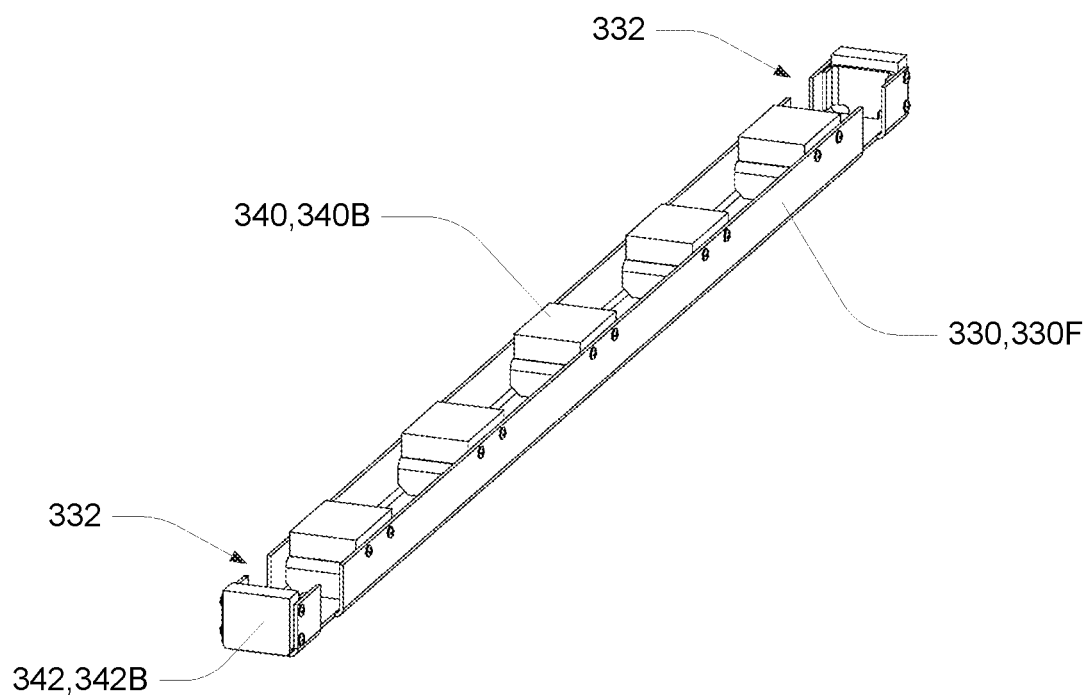
Figure 10C:
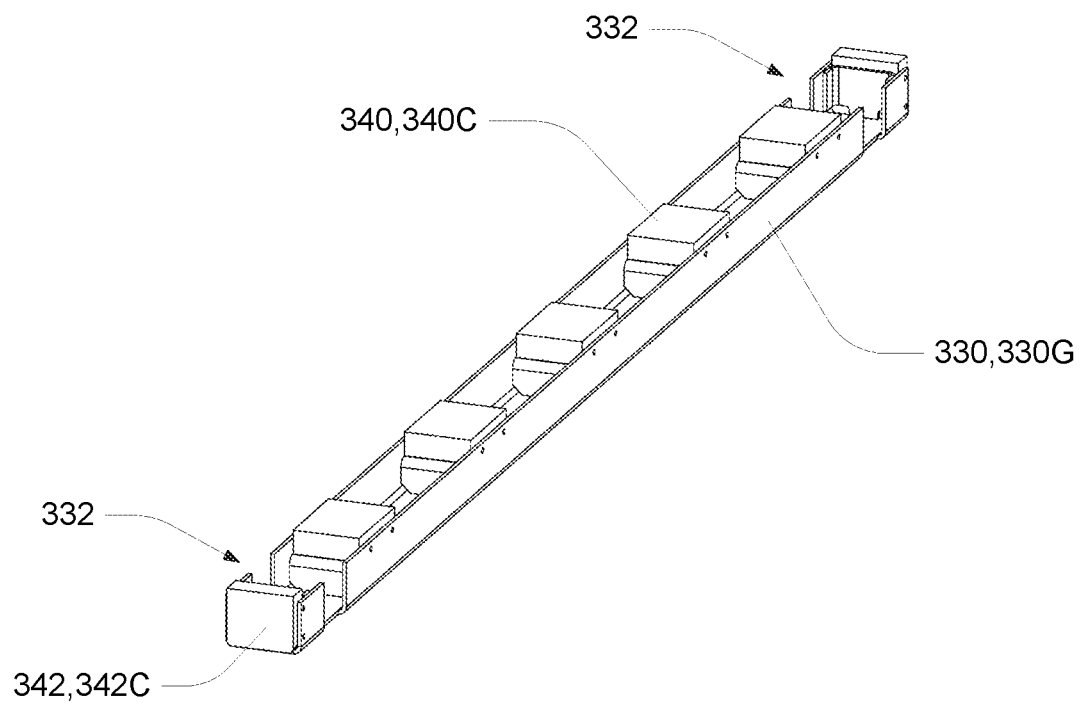
Figure 10D:
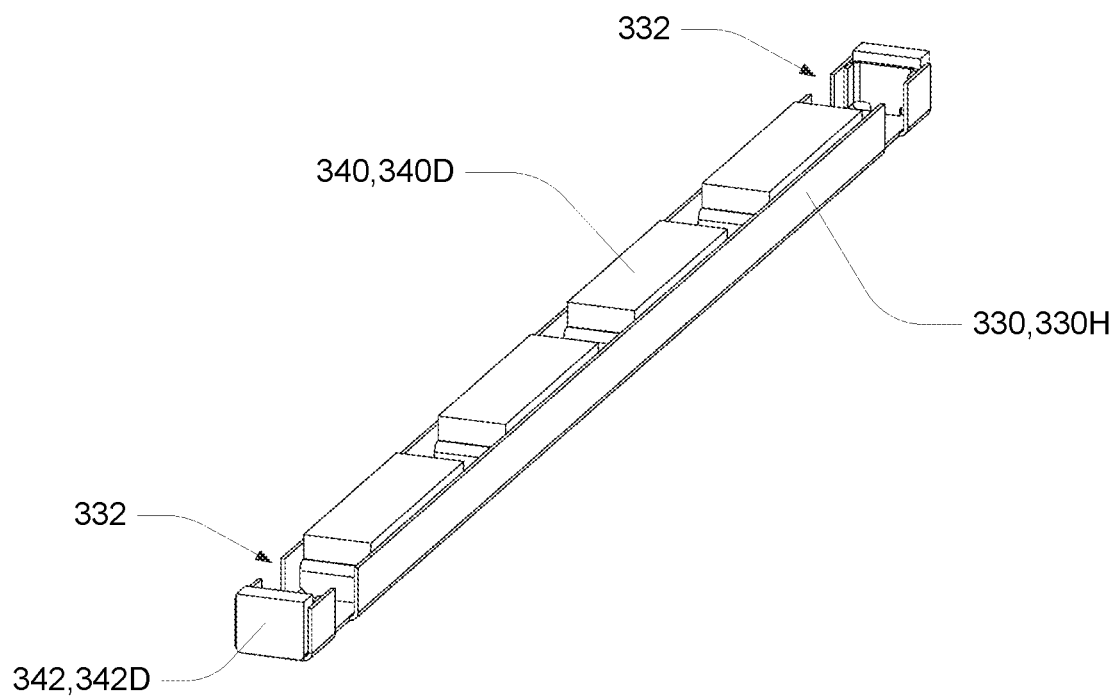

FIG. 10A through FIG. 10D show example embodiments of belt support elements configured for receiving two chains. In these examples, the support channels 330 (330E, 330F 330G, 330H) are substantively a 'C' channel in cross-section. FIG. 10A shows the glide elements fixed to a spacer element coupled to the support channel. FIG. 10B shows the glide elements fixed through the side walls of the support channel. FIG. 10C shows the glide elements fixed through the side walls of the support channel. FIG. 10D shows glide elements being wider for providing a greater glide surface.

It will be appreciated that glide elements, or inserts, can be inserted in the slat element in different transverse widths and/or numbers. Separate guide elements of different materials can also be used to provide alternative properties.

It will be appreciated that the glide elements can be bolted, screwed or pinned to the slat element. It will be appreciated that, as the slat element is substantively a 'C' channel, rigidly fixing (e.g. with bolts or screws) the glide elements within the slat element can improve rigidity of the slat element.

In an embodiment, the design is based on a plurality of spaced crossmember (or ribs), that are configured to enable a belt assembly to loops above and back through each crossmember. Typically, a floor plate is located above (or atop) the crossmembers to provide a glide surface for the belt assembly under load. This provides an advantage that the centre of gravity can be relatively lower than existing conveyor systems, while enabling standard or relatively narrow mounting (typically directly at the chassis rails of a truck or trailer).

It will be appreciated that the support channels can be similarly configured for conveyor systems comprising more than three chains.

In an embodiment, by way of example, there is provided a conveyor system for use on a pair of chassis rails provided by a vehicle or trailer, the system including:

a plurality of elongate rib elements coupled in a spaced transverse configuration atop the pair of chassis rails, each of the rib elements defining an elongate through opening (or aperture);

a planar support element coupled atop the rib elements, for providing a surface that supports a portion of the conveyor belt assembly under load applied by the cargo;

a pair of opposed longitudinal sidewalls (or side sheets) coupled atop the planar support element (of floor sheet);

a conveyor belt assembly including a conveyor belt, a plurality of transverse belt support elements (or slats) coupled across a plurality substantively parallel lengths of conveyor chains, and coupled to the conveyor belt;

whereby the planar support element is sized to enable a path for the conveyor belt system being drawn along the planar support element and returned through the apertures defined in each rib element, thereby providing a return path of a conveyor belt system when formed in continuous loop configuration; and a pair of transverse axles operating about each end of the conveyor assembly (when in the continuous loop configuration), each axle having a gear for engaging a respective chain, wherein one axle is driven by a motor to move (or cycle) the conveyor belt assembly.

It will be appreciated that the conveyor systems described therein can be used on a pair of chassis rails provided by a vehicle and/or trailer.

It will be appreciated that embodiments of the invention can comprise many forms and advantages.

In an embodiment, a series of parallel slats are coupled to the belt, wherein the drive chains are coupled to the slats and suspended above the support plate. A compression plate (typically of metal) can be located about each side of the recess (or cut-out) adapted to receive the chain.

In an embodiment, wear caused by belt movement is primarily associated with a series of glide elements retained by the slats.

In an embodiment, the belt, slat elements, glide elements and chain are releasably coupled such that repair and maintenance can be undertaken on individual items.

In an embodiment, the slats are constrained laterally by end glide elements of the slats abutting against a sidewalls/side sheet.

In an embodiment, the side sheet is a single metal sheet having a lateral (or horizontal) fold to forming a support surface for the belt and a further downward (or vertical) fold toward the floor plate for guiding the slats (with clearance to limit jamming). The side sheet is typically affixed or welded to the floor plate (or support surface).

In an embodiment, a front sheet (or headboard) interconnects the side sheets at their forward end.

It will be appreciated that an embodiment provides a total width of the conveyor belt being wider than conventional, but within legislative limitations.

The chains join interlinks the slats using ears (used in a conventional manner). Attachment chain are used with ears attached to (or formed with) selected links for coupling to a respective slat element. However, it will be appreciated that an advantage of this system is that the chains do not require guides, thereby reducing wear. This also provides the advantage that the belt can be removed by splitting the chain and withdrawing the belt assembly, leaving a substantively flat floor plate. Close elements can cover the conveyor belt egress and ingress points at each end of the floor plate to enable use of the truck or trailer without the conveyor belt assembly installed.

It will be appreciated that disclosed embodiments reduce the features that would require maintenance on the truck. A belt assembly can be removed for repair or maintenance (and replaced in the meantime).

It will be appreciated that the slat element fits over the chain, whereby the chain is coupled to the slat element such that the slat assembly takes vertical loads from the cargo, while maintaining the chain above the floor plate. The chain, being separated from the floor plate, carries no compression loading applied by the cargo. This separation from the floor plate reduces wear and noise, with the wear being associated with the glide elements (which are more easily replaced, and can be selected for providing a lower coefficient of friction, typically formed in plastics). The chain is only under tension when sliding (or moving) the cargo. The slats substantively protect the chain from cargo impact. Whereby a slat can be replaced if damaged. Accordingly, such repairs and replacements can be typically occur on-site. The slat elements and glide elements become somewhat sacrificial in protecting the chain, thereby enabling superior reliability, enhanced maintainability and improved wear.

It will be appreciated that embodiments of slat assembly can be formed in many configurations. By way of example, the material thickness of the slat elements can be modified to provide appropriate strength for intended loads. By way of example, the material volume and properties of the glide elements can be modified to provide appropriate strength for intended loads.

In an embodiment, glide elements (or glide inserts) are typically formed of plastics, for example Polytetrafluoroethylene (PTFE), and are replaceable. PTFE is softer, and modifiable with selectable fillers (glass, stainless steel, carbon) to change the properties such as wear resistance, thermal conductivity and the like. The glide insert is typically of a substantially regular shape, thereby requiring less machining, and couples to the slat element. It will be appreciated that the glide element friction and ware properties against the floor plate, as well as thermal properties, can be selected/matched for intended load of haulage. For example, asphalt is carried out about 180 deg C. with heat generally transmitted through the belt slats and glide elements.

Glide elements are formed of suitable materials, particularly selecting a static coefficient of friction under load, impact resistant, and temperature resistance. Plastics are typically formed of PTFE with or without fillers. Typically the glide elements are formed of plastics, preferably integrally formed (or milled).

It will be appreciated that disclosed embodiments enable multipurpose carriers (rock, sand, asphalt), whereby the belt (and slat) assembly can be selected for the task.

In different embodiments, slat elements can be added or removed based on the expected load. The chain element can be selected for different ratios between links with ears and links without ears. Further, not all ears need to be used. It will be appreciated that a belt assembly can be preassembled in a split format on a skid, whereby the skid can be brought to a truck, and the hydraulic motors can be used to draw in the lead and of the belt assembly. The truck or trailer does not require substantive modification for different belt assemblies.

A further advantage of this system, is that the number of chains can be easily modified (typically two or three, but more can be added for higher loads). The main modification required on the truck or trailer is providing the respective number of gears (or cogs) at the drive and driven conveyor axles.

It will be appreciated that conveyor chains have limited longitudinal tension capacity. The number of chains can be increased or decreased depending on the intended load capacity. This is particularly relevant for long body trays or trailers, which typically require additional chains to draw the belt under load. Changing the number of chains can be accommodated with more recesses (or cut-out) defined by the slat element, and provision of additional driving and driven conveyor gears (or cogs) located on the conveyor axles and each end. The conveyor axles, and drive motor and gearing for driving the drive axle, will be selected to withstand sufficient torsion for drawing the belt under load.

It will be appreciated that the slat elements have a cut out for receiving each chain. The chain typically has ears coupled to chain links, which are uniformly spaced by chain links without ears, wherein the chain ears are coupled about the top surface of the slat element, such that the chain is held up toward the top of the slat element.

It will be appreciated that the number of chains used in a belt assembly can be accommodated by adding or removing gears (or cogs) on respective conveyor axles, and without substantive modification of the truck (e.g. not requiring chain guides). The drive and driven gears (or cogs) are fixed to respective conveyor axles for indexing the chains. Synchronised movement of the chains limit torsion or bending applied to slat elements.

It will be appreciated that the conveyor system provides an advantage that the belt assembly is self-guiding within the truck or trailer body. This is achieved with the slats having end glides 342 that can abut sidewalls 112 of a side sheet 110 (for example, as shown in FIG. 8C), when under transverse or lateral loading. Appropriate separation/tolerances are provided to limit the conveyor system jamming. The slats are attached to chains that operate under indexed movement on cogs 352 of a drive axle 351. This eliminates the requirement for the chains to operate within a guide, resulting in the possibility of using a flat floor sheet 210.

It will be appreciated that the conveyor system provides an advantage that the belt assembly is self-cleaning within the truck or trailer body. This is achieved with the slats having glides 340 (for example, glide elements 340A through 340D as shown in FIG. 9A through FIG. 10D) that slide along the floor sheet 210 (for example as shown in FIG. 6A), particularly when under vertical loading from cargo. The slats are attached to chains that operate under indexed movement on cogs 352 of a drive axle 351. This causes the glide elements to slide along the floor sheet, thereby moving any encountered debris along the floor sheet. This advantage is further enhanced by the system not requiring chain guides, resulting in the possibility of using a flat floor sheet that can be more easily cleaned.

It will be appreciated that the conveyor system provides an advantage that the belt assembly is self-cleaning within the truck or trailer body, as discussed above. This is further enhanced through use of sweeper glide elements having a wider transverse width (for example, glide element 340D as shown in FIG. 9D and FIG. 10D) thereby providing a belt support element in a sweeper configuration.

It will be appreciated that the illustrated embodiments provide a conveyor system for use on vehicle tray or trailer.

It will be appreciated that the wide conveyor belt assembly, combined with the integrated sidewalls, is inherently adapted for haulage and delivery of bulk loose materials (e.g. mulch, gravel and sand). The inclusion of thermal insulation between the conveyor belt and the supports, provide inherent adaption for haulage and delivery of hot materials (e.g. bitumen).

Although embodiments of the invention have been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly, it should be appreciated that in the above description of exemplary embodiments of the invention, various features of are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, an element described herein of an apparatus embodiment is an example of a means for carrying out the function performed by the element for the purpose of carrying out embodiments of the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A conveyor system, the system having a tray assembly including:
   a plurality of elongate rib elements coupled in a transverse configuration across atop a pair of chassis rails provided by a vehicle or trailer; and
   wherein each of the rib elements define an elongate through opening for providing a return path of a conveyor belt assembly.

2. The conveyor system according to claim 1, wherein the rib elements include cut-outs along a lower edge for receiving the chassis rails.

3. The conveyor system according to claim 1, wherein the through opening of the rib elements is wider than the chassis rail separation.

4. The conveyor system according to claim 1, wherein the rib elements are configured from 'C' channel.

5. The conveyor system according to claim 1, wherein the rib elements are spaced along the chassis rails and underpin a planar support element for supporting a portion of the conveyor belt assembly.

6. The conveyor system according to claim 5, wherein the conveyor belt assembly includes a plurality of transverse belt support elements.

7. A conveyor system according to claim 1, wherein the conveyor belt assembly includes:
   a plurality of transverse belt support elements coupled in a transverse configuration across a plurality of substantially parallel lengths of conveyor chains; and
   wherein the belt support element supports a conveyor belt element under load.

8. The conveyor system according to claim 7, wherein the conveyor belt assembly forms a loop configuration that is drawn atop a planar support surface and returns via through openings in rib elements of a tray assembly.

9. The conveyor system according to claim 7, wherein:
   the rib elements include cut-outs along a lower edge for receiving the chassis rails;
   the through opening of the rib elements is wider than the chassis rail separation;
   the rib elements are configured from 'C' channel; and
   the conveyor belt assembly forms a loop configuration that is drawn atop the planar support surface and returns via through openings in the rib elements.

10. The conveyor system according to claim 8, wherein each belt support element is coupled to the plurality of conveyor chains, such that vertical forces applied by the cargo are not directly applied between the chain and planar support element.

11. The conveyor system according to claim 8, wherein each belt support element is operatively associated with the conveyor belt element, and transfers load applied by cargo to a planar support element.

12. The conveyor system according to claim 8, wherein each belt support element includes support channel having glide elements that provide reduced friction between the belt support element and the planar support element.

13. The conveyor system according to claim 12, wherein thermal insulation is provided between the conveyor belt element and glide elements.

14. A conveyor system for use on a pair of chassis rails provided by a vehicle or trailer, the system including:
   a plurality of elongate rib elements coupled in a spaced transverse configuration atop the pair of chassis rails, each of the rib elements defining an elongate through opening;
   a planar support element coupled atop the rib elements, for providing a surface that supports a portion of a conveyor belt assembly under load applied by cargo;
   a pair of opposed longitudinal sidewalls coupled atop the planar support element;
   the conveyor belt assembly including a conveyor belt element, a plurality of transverse belt support elements coupled across a plurality substantively parallel lengths of conveyor chains, and operatively associated with the conveyor belt element;
   whereby the planar support element is sized to enable a path for the conveyor belt assembly being drawn along the planar support element and returned through the through opening defined in each rib element, thereby providing a return path of a conveyor belt assembly when formed in continuous loop configuration; and
   a pair of transverse axles operating about each end of the conveyor assembly, when in the continuous loop configuration, each axle having a gear for engaging a respective chain, wherein a first axle is coupled to a motor for moving the conveyor belt assembly.

15. The conveyor system according to claim 14, wherein the first axle is coupled to a pair of motors for moving the conveyor belt assembly.

16. The conveyor system according to claim 14, wherein a second axle is coupled to one or more motors for moving the conveyor belt assembly.

17. The conveyor system according to claim 14, wherein the belt support elements are self-guiding within a tray portion of the vehicle or trailer.

18. The conveyor system according to claim 14, wherein the belt support elements are substantively self-cleaning.

19. The conveyor system according to claim 14, wherein at least one or more of the belt support elements are in the form of a sweeper configuration.

20. The conveyor system according to claim 14, when used on chassis rails associated with a vehicle tray or a trailer, thereby providing a conveyor belt that is wider than the separation of the chassis rails.

* * * * *